(12) United States Patent
Pena et al.

(10) Patent No.: US 12,182,310 B1
(45) Date of Patent: *Dec. 31, 2024

(54) SYSTEMS AND METHODS FOR SELECTIVELY SCRAMBLING DATA

(71) Applicant: United Services Automobile Association (USAA), San Antonio, TX (US)

(72) Inventors: Ric M. Pena, Boerne, TX (US); Arthur Quentin Smith, Fredericksburg, TX (US); Brian Tougas, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/352,951

(22) Filed: Jul. 14, 2023

Related U.S. Application Data

(63) Continuation of application No. 16/945,185, filed on Jul. 31, 2020, now Pat. No. 11,741,260.

(51) Int. Cl.
*G06F 21/62* (2013.01)
*H04L 5/00* (2006.01)
*H04L 67/53* (2022.01)

(52) U.S. Cl.
CPC ........ *G06F 21/6254* (2013.01); *H04L 5/0044* (2013.01); *H04L 67/53* (2022.05)

(58) Field of Classification Search
CPC ............. G06F 21/6254; G06F 16/9535; H04L 5/0044; H04L 9/0825; H04L 67/53
See application file for complete search history.

(56) References Cited

U.S. PATENT DOCUMENTS

| | | | |
|---|---|---|---|
| 6,615,251 B1* | 9/2003 | Klug | G06F 16/958 709/224 |
| 7,835,990 B2* | 11/2010 | Coleman | G06Q 10/00 705/14.66 |
| 9,223,995 B1* | 12/2015 | Lavinio | H04L 63/0421 |
| 9,602,477 B1 | 3/2017 | Grzybowski et al. | |
| 11,146,599 B1* | 10/2021 | Jackson | H04L 65/1101 |
| 2002/0138850 A1 | 9/2002 | Basil et al. | |
| 2004/0009777 A1* | 1/2004 | Koskimies | H04M 1/72412 455/456.1 |
| 2007/0098000 A1 | 5/2007 | Wajs et al. | |
| 2010/0246819 A1 | 9/2010 | Candelore | |
| 2011/0239287 A1 | 9/2011 | Pak et al. | |
| 2015/0058622 A1 | 2/2015 | Sturgill et al. | |
| 2016/0277374 A1 | 9/2016 | Reid et al. | |
| 2016/0323247 A1* | 11/2016 | Stein | G06Q 20/02 |
| 2017/0048245 A1 | 2/2017 | Owen et al. | |
| 2017/0070495 A1 | 3/2017 | Cherry et al. | |
| 2017/0171161 A1* | 6/2017 | Johansson | H04L 63/08 |
| 2018/0247078 A1* | 8/2018 | Newman | G06F 16/93 |
| 2020/0137164 A1* | 4/2020 | Fein | H04L 67/02 |
| 2021/0133035 A1 | 5/2021 | Moldvai et al. | |
| 2022/0060514 A1 | 2/2022 | Hu et al. | |
| 2022/0391537 A1* | 12/2022 | Gotthardt | H04W 12/02 |

* cited by examiner

*Primary Examiner* — Shanto Abedin
(74) *Attorney, Agent, or Firm* — Fletcher Yoder, PC

(57) ABSTRACT

A technique for selectively scrambling data obtained by electronic sensor devices, such as cameras, voice communication devices, and the like, is provided. A payload of the data is scrambled when one or more characteristics of the data indicate that the data may include sensitive information. The scrambled data is transmitted to a target device.

18 Claims, 5 Drawing Sheets

SYSTEMS AND METHODS FOR SELECTIVELY SCRAMBLING DATA

CROSS-REFERENCE TO RELATED APPLICATION

The present application is a continuation of U.S. patent application Ser. No. 16/945,185, titled "SYSTEMS AND METHODS FOR SELECTIVELY SCRAMBLING DATA," filed on Jul. 31, 2020, which is herein incorporated by reference in its entirety for all purposes.

BACKGROUND

The present disclosure relates generally to data privacy. More specifically, the present disclosure relates to preventing third parties from accessing data that a user desires to remain private.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A dwelling or other structures may utilize certain devices (e.g., electronic sensor or smart home devices) to provide certain benefits to a user associated with the dwelling. For example, the smart home devices (e.g., doorbells, cameras, audio devices, voice interaction devices, temperature controllers) that acquire certain data (e.g., video data, audio data) may provide benefits such as convenience, improving security of the dwelling, and/or improving the efficiency of performing certain tasks in the dwelling (e.g., controlling climate, purchasing products, scheduling tasks). At least in some instances, the electronic sensor devices may be managed or maintained by certain third parties that require that the user authorize (e.g., via signature, accepting terms and conditions, and the like) the third parties to receive, store, own, and/or have access to the data in order for the user to utilize the electronic sensor devices. However, certain data acquired by the electronic sensor devices may include sensitive information (e.g., passwords, personal photos/videos, authentication information, social security numbers, political affiliation, religious affiliation, social views) or other personal information that the user may not want the third party to access.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to an electronic device, comprising a processor and a tangible, non-transitory, computer-readable medium, including instructions that, when executed by the processor, cause the processor to determine that data captured by one or more electronic sensor devices is to be transmitted to a third-party device. The instructions also cause the processor to scramble a payload portion of the data to generate scrambled data. Further, the instructions cause the processor to transmit the scrambled data to the third-party device.

In another embodiment, the present disclosure relates to a method. The method includes determining, via a processor, that data received from one or more electronic sensor devices disposed within a property have one or more characteristics characterized as sensitive information associated with a property owner of the property. The method also includes scrambling, via the processor, a payload portion of the data to generate scrambled data in response to determining that the data has the one or more characteristics indicating that the data comprises the sensitive information. Further, the method includes transmitting, via the processor, the scrambled data as a payload to the third-party device associated with the one or more electronic devices.

In another embodiment, the present disclosure relates to a tangible, non-transitory, machine-readable medium comprising instructions that, when executed by a processor, cause the processor to perform operations including determining that data received from one or more electronic sensor devices disposed within a property is associated with a property owner of the property. The operations also include scrambling a payload portion of the data to generate scrambled data in response to determining that the data is associated with the property owner. Further, the operations include transmitting the scrambled data as a payload to the third-party device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
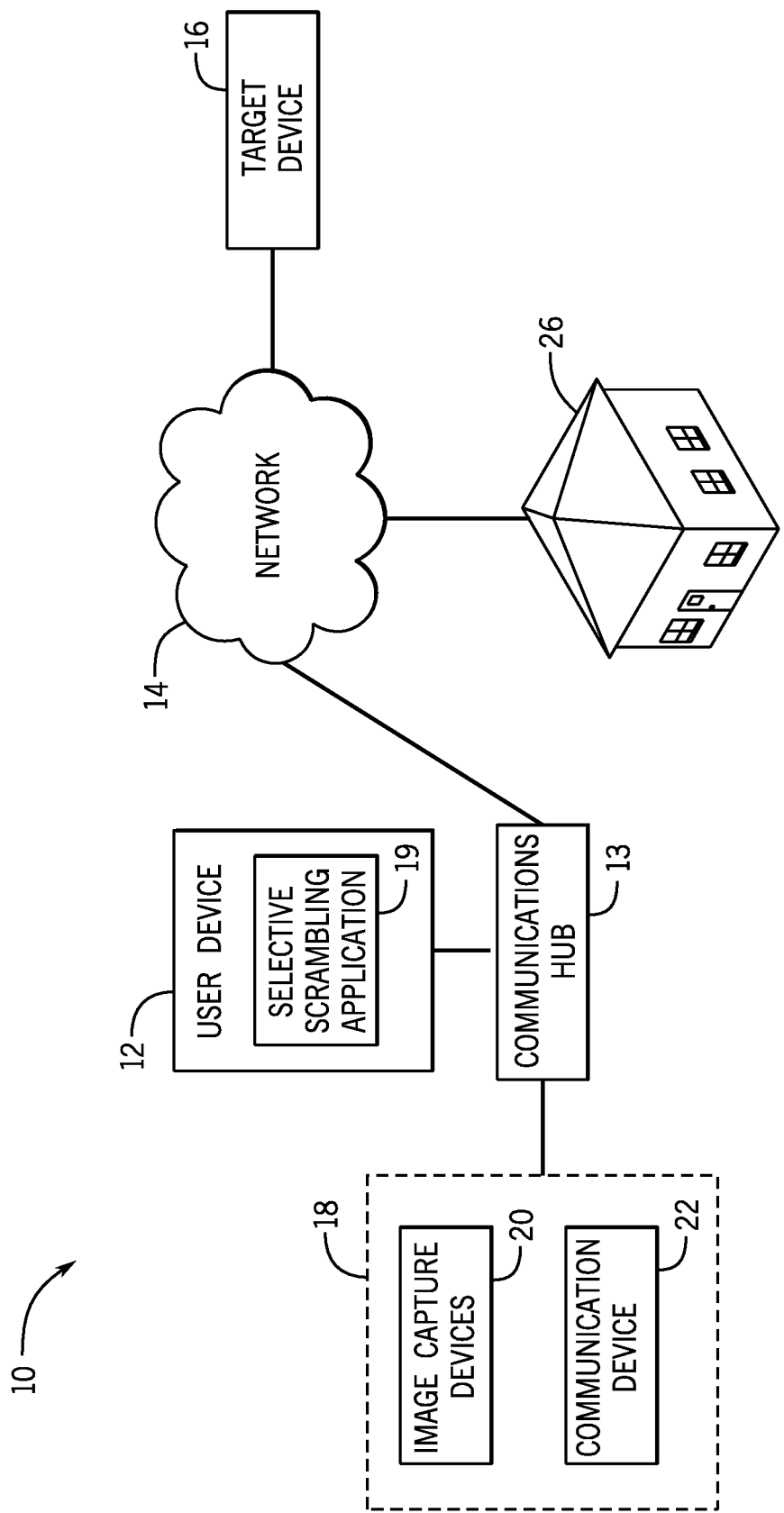
FIG. 1 is a block diagram of a selective scrambling system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "some embodiments", "one embodiment", or "an embodiment" of the present disclosure are not intended to be interpreted as excluding the existence of additional embodiments that also incorporate the recited features.

As used herein, the term "application" refers to one or more computing modules, programs, processes, workloads, threads, and/or computing instructions executed by a computing system. Example embodiments of an application include software modules, software objects, software instances, and/or other types of executable code.

It is presently recognized that it may be advantageous to enable a user (e.g., a dwelling or property owner) to allow or deny utilization by a third party of at least a portion of data captured by a smart home device (e.g., electronic sensor or smart home devices), while still enabling the user to utilize the smart home device to improve the security of the dwelling and/or improve the efficiency of certain tasks. For example, the user may not desire to transmit image data and/or audio data that contains sensitive data or information acquired by a camera and/or audio device while still allowing the electronic sensor devices to operate. As one non-limiting example, the user may not desire to transmit data associated with video meetings with doctors or health providers, accountants, and attorneys. Accordingly, embodiments of the present disclosure relate to selectively scrambling data that is being sent to a third party. In particular, the payload of a data packet used to transmit the data captured by the electronic sensor device may be scrambled, while a header and metadata of the data packet may be maintained (e.g., not scrambled). By scrambling the payload of the data packet and not the payload or metadata of the data packet, the data packet will appear normal to the target device, such that third party may not discern that the data is not in an expected format, has been scrambled, or otherwise altered. As such, the user may continue to receive the benefits of having the electronic sensor device maintained or managed by the third party (e.g., warranty registration, software updates, firmware updates). In this way, the user may continue to utilize the electronic sensor data to provide security to the user and improve the efficiency of tasks performed by the user because the third party may still receive and store the scrambled data. However, the scrambled data may be unusable by the third party, thereby protecting the privacy of the user.

With the foregoing in mind, FIG. 1 is a block diagram of a selective scrambling system 10 that includes a user device 12, a communication hub 13, a network 14, a target device 16, electronic sensor or smart home devices 18, and the like. The user device 12 may include an electronic device having a processor that, in some embodiments, performs one or more operations described herein. The user device 12 may be worn, held, or associated with the property owner (e.g., the user) of a property 26. For example, the user device 12 may be a personal computer, laptop computer, tablet computer, smart phone, and so forth. In some embodiments, the user device 12 may be a router or similar computer networking device. The user device 12 includes instructions executable by the processor to scramble a payload of data acquired by electronic sensor devices 18. As referred to herein, scrambling data includes randomizing at least a portion of the data by randomly inserting and/or deleting portions of the payload to generate data that is unusable, such as by inserting random numbers, strings, and/or binary bits, and/or deleting data from the payload.

The target devices 16 may include similar electronic devices to the user device 12, such as a personal computer, laptop computer, tablet computer, smartphone, and so on. However, the target devices 16 (e.g., third-party devices) may include electronic devices of a third party that request that the property owner provide the data obtained by the electronic sensor devices 18 in order to, for example, continue utilizing the electronic sensor devices 18.

The electronic sensor devices 18 generally include devices that may generate, acquire, and/or receive data (e.g., image capture data, audio data, electronic data, and the like), such as an image capture device 20 (e.g., camera, video recording device, and the like), an audio communications or capture device 22 (e.g., microphones, voice communication devices, and the like), and other devices that may detect electronic device usage, movement of a user, ranges of conditions associated with the property 26 (e.g., water usage, whether lights are on, and whether windows are open), occupancy of users and so forth. For example, the electronic sensor device 18 may include cameras that record image capture data of views at entrances of the property 26, or in rooms where sensitive items are stored (e.g., social security cards, passports, driver's licenses, and credit card statements). However, the electronic sensor devices 18 may inadvertently capture images of people in situations that the property owner do not wish to share with the third party (e.g., changing clothes and showering). As another non-limiting example, the electronic sensor devices 18 may include audio detectors (e.g., voice communication devices, speakers, and microphones) that receive voice commands by the property owner. However, the electronic sensor devices 18 may capture information that the property owner may not wish to share, such as vacation plans, political views, passwords, religious affiliations, and the like. Although the property 26 is illustrated as being separate from the electronic sensor devices 18, it should be noted that the electronic sensor devices 18 may be disposed inside of a structure associated with the property 26, or outside the structure and communicatively coupled to the user device 12.

As illustrated, the user device 12 is communicatively coupled to the electronic sensor devices 18 via the communication hub 13. The communication hub 13 may be a WiFi router, a smart device hub, or any other communication device that enables one or more electronic sensor device 18 to communicate with a network. In general, the user device 12 may monitor, receive, generate, and/or intercept data captured by the electronic sensor devices 18. The user device 12 may store a selective scrambling application 19 that scrambles the data captured by the electronic sensor devices 18, and the user device 12 may store the scrambled data. As used herein, intercepting data refers to receiving data (e.g., from an electronic sensor device 18) and preventing the data from being transmitted to the target device 16 (e.g., until the selective scrambling application 19 and/or the user device 12 has a chance to analyze and/or scramble the data). The user device 12 may then, for example, transmit the scrambled data. Additional details with regard to example components that may be part of the user device 12 are described below with reference to FIG. 2.

In general, the selective scrambling application 19 may include a software application having instructions executable by a processor of the user device 12 to identify, intercept, and/or receive data from the electronic sensor devices 18 and scramble the data. As referred to herein, scrambling data includes randomizing at least a portion of the data by randomly inserting and/or deleting portions of the data to generate a data that is unusable, such as by inserting random numbers, strings, and/or binary bits, and/or deleting data. For example, the scrambling application 19 may scramble the data acquired by the electronic sensor devices 18 using an algorithm such as the common scrambling algorithm (CSA), additive scrambling, multiplicative scrambling, and so on. As discussed in more detail below, the selective scrambling application 19 may enable the user device 12 to receive data transmitted by an electronic sensor device 18, intercept (e.g., via the communications hub 13) the data, and scramble the data such that the target device 16 receives scrambled data instead of the "raw" or original data captured by the electronic sensor device 18. As such, the selective scrambling application 19 may scramble the raw data generated by the electronic sensor device 18, and the user device 12 may generate a data packet having the scrambled data as a payload. Additionally or alternatively, the selective scrambling application 19 may intercept a payload of a data packet that includes the raw data and scramble the payload or portion of the payload to generate a scrambled payload. In any case the scrambled raw data or scrambled payload are transmitted to the target device 16 as a data packet (e.g., scrambled data packet). In some embodiments, the user may provide (e.g., via parameters set by the user) a degree of scrambling to be performed. For example, the degree of scrambling may range from relatively low amount of scrambling of the payload (e.g., 1%, 5%, 10%, 15%, or less than 50% of the payload, which may be at least partially decipherable) to relatively high amount of scrambling of the payload (e.g., greater than 50% of the payload, which may be practically indecipherable or requiring time to decipher above a threshold).

In one embodiment, the selective scrambling application 19 may receive the data generated by the electronic sensor devices 18 and determine whether or not to scramble the data based on characteristics of the data, such as the type of the data, a size of the data, a company associated with the target device 16 to receive the data, a time range associated with when the data was capture, a type of device (e.g., scrambling all video data captured by a nanny cam), specific instructions (e.g., trust list, non-trusted list for certain devices), and the like. For example, the selective scrambling application 19 may determine whether the data is audio data, image data, or video data, and thus associated with a camera of the electronic sensor devices 18, based on a type of the data (e.g., .avi, .mov, .mp3). As such, the selective scrambling application 19 may scramble the data in response to determining that the type of the data corresponds to audio data, image capture data, and/or video data. As another non-limiting example, the selective scrambling application 19 may determine whether to scramble the data based on the size of the data (e.g., which may be indicative of the type of the data). That is, the selective scrambling application 19 may compare a size of the data to a predetermined data size threshold (e.g., provided by a user or programmed prior to implementation). When the data size is above the threshold, the selective scrambling application 19 may scramble the data. In particular, the threshold may be indicative that the data is audio data, image capture data, and/or video data, as such data may be of relatively large size. As another non-limiting example, the selective scrambling application 19 may determine whether or not to scramble the data based on a company associated with the target device 16 that may receive the data.

As discussed above, the selective scrambling application 19 may receive the data generated by the electronic sensor devices 18 and determine whether or not to scramble the data based on characteristics of the data, such as the type of the data, the size of the data, the company associated with the target device to receive the data, and so. In some embodiments, the characteristics may include a user agreement indicating that the data captured by the electronic sensor device 18 should be transmitted to the target device 16 to continue using the electronic sensor device 18. For example, the third party may condition performing a service (e.g., monitoring the electronic sensor device 18, saving or storing data acquired by the electronic sensor device 18) based on whether the user accepts the user agreement. In some embodiments, when the user initially rejects a user agreement (e.g., in order to keep the captured data private), the user device 12 and/or the selective scrambling application 19 may generate (e.g., cause a display of the user device 12 to display) a pop-up or notification that notifies the user that the selective scrambling application 19 may scramble the data captured by the electronic sensor device 18, and send the scrambled data to the target device 16, while enabling the user to accept with the user agreement. The pop-up or notification may include an input (e.g., an "OK" button) that, when selected by the user, causes the selective scrambling application 19 to scramble the data and accept the user agreement. As such, the selective scrambling application 19 may continue to scramble all data from the electronic sensor device 18 and send the scrambled data to the target device 16, until the user changes his or her mind (e.g., via a settings menu). That is, the user may ultimately accept the user agreement, but the data will be scrambled, and, therefore, unusable by the third party. In this manner, the selective scrambling application 19 may enable performance of a third-party service that requires acceptance of a user agreement, without sacrificing user privacy.

In some embodiments, the selective scrambling application 19 may prompt a user to provide an input (e.g., an authorization) indicating whether or not to scramble the data prior to sending the data to a target device 16 (e.g., a third-party target device). For example, the selective scrambling application 19 may output a control signal that causes a pop-up or notification to be displayed on a display of the user device 12 that is running the selective scrambling application 19. In some embodiments, the pop-up or notification may depict one or more buttons for the user to select indicating whether or not to scramble the data captured by the electronic sensor devices 18. Additionally, the selective scrambling application 19 may display device data information on the display of the user device 12 that may inform the user of what the data contains, is associated with, and so on. For example, the device data information may be a summary of the data, such as an identity or type of an electronic sensor device 18 that captures the data, an indication of the time or time range when the data was captured by the electronic sensor device 18, a size of the data, and the like. In alternative or additional embodiments, the selective scrambling application 19 may default to scrambling the data capture by an electronic sensor device 18 (e.g., in the case of a new electronic sensor device 18 connected to the network 14, the captured data having a certain type of data, such as audio data, video data, and/or image capture data) unless the user has specified not to.

In additional or alternative embodiments, the selective scrambling application 19 may determine whether to scramble the data based on when the data is transmitted. That is, the selective scrambling application 19 may detect that the electronic sensor device 18 is transmitting data, whether synchronous data or asynchronous data. As referred to herein, synchronous data transmission refers to transmitting data continuously and without start or stop bits to signify the end of transmitted data, and asynchronous data transmission refers to transmitting data intermittently and using start and stop bits to signify the beginning and end of transmitted data. As a non-limiting example, video data and/or image data acquired by an electronic sensor device 18 may have relatively large memory requirements. Rather than transmitting the video data and/or image data to the target device 16 as the video and/or image data is generated, the electronic sensor device 18 may have a scheduled time period to transmit video and/or image data based on whether the user is likely to be captured in the video and/or image data at the scheduled time period (e.g., during the night when the user is typically at home instead of during the day while the user is at work.) As such, the periodicity of when the data is being transmitted may be related to the type of data being transmitted. In such instances, the selective scrambling application 19 may determine to scramble the data based on the periodicity of when the data is being sent and/or the amount of data being sent.

In response to determining that the electronic sensor device 18 is transmitting data, the selective scrambling application 19 may intercept the data and automatically determine to scramble the data. As used herein, intercepting data refers to receiving the data, e.g., from an electronic sensor device 18, and preventing the data from being transmitted to the target device 16 (e.g., until the selective scrambling application 19 and/or the user device 12 has a chance to analyze and/or scramble the data). The user device 12 may then transmit the scrambled data. For example, the selective scrambling application 19 may intercept data captured by the electronic sensor devices 18 via the communications hub 13. That is, the electronic sensor device 18 may send raw captured data to the communications hub 13 to be uploaded to the target device 16. After receiving the captured data, and prior to the communication hub 13 sending the captured data to the target device 16, the selective scrambling application 19 may cause the communication hub 13 to stop the captured data from being sent to the target device 16. The selective scrambling application 19 may then analyze, and, in some cases, scramble the captured data. The selective scrambling application 19 may then cause the communication hub 13 to send the scrambled data (e.g., in place of the captured data) to the target device 16. In other cases, where the user has authorized the captured data to be shared with the target device 16 without scrambling the captured data, the selective scrambling application 19 may cause the communication hub 13 to send the captured (e.g., raw) data to the target device 16. In some embodiments, the processor 30 may intercept data based on user-defined criteria related to a data type, time periods, a type of sensor, and the like. In some embodiments, the selective scrambling application 19 may include a client/server (C/S) app, a non-C/S app, or a federation of cooperative or integrated apps.

In any case, the selective scrambling application 19 may prompt the user to provide an input (e.g., via an input device such as touchscreen, mouse, keyboard) indicating whether or not to scramble the data before sending the data to the target device 16, such as by providing a user selectable control (e.g., a button) to scramble the data on a display of the user device 12. Additionally, the selective scrambling application 19 may display device data information (e.g., information associated with the data collected by the electronic sensor device 18) on the display of the user device 12 that may inform the user of what the data contains, is associated with, and so on. The device data information may include a summary of the data captured by the electronic sensor device 18, such as an identity or type of an electronic sensor device 18 that captures the data, an indication of the time or time range when the data was captured by the electronic sensor device 18, a size of the data, and the like. In some embodiments, the user device 12 may default to scrambling the data captured by an electronic sensor device 18 (e.g., in the case of a new electronic sensor device 18 connected to the network 14, the captured data including a certain type of data, such as audio data, video data, and/or image capture data) unless the user has specified not to.

Additionally or alternatively, the user device 12 may automatically determine whether or not to scramble the data based on user-defined criteria and/or filter data, such as keywords indicating a type of data (e.g., image data, video data, audio data), an identifier of a company (e.g., a name, identification number, identifying string) associated with the third party, a time period, an input (e.g., text input, verbal input, and image input) indicating certain data that is categorized as sensitive information (e.g., birthdays, account information, passwords, information associated with passwords), and the like. In general, the filter data and/or user-defined criteria may indicate the conditions that the user does or does not want to scramble data to make the data unusable by third parties. For example, the user may use his or her prior knowledge of the type of electronic sensor devices 18 utilized within the property 26 to determine that data transmitted by electronic sensor devices 18 associated with a first company (e.g., organizations including government entities, schools, clubs, associations, churches) should be scrambled, while data transmitted by electronic sensor devices 18 associated with a second company should not be scrambled. As another non-limiting example, the user may only want to transmit user data during the day, which may correspond to when the user is away from the property 26. Accordingly, the filter data may include a time period (e.g., 6 PM to 8 AM) when the user wants to scramble the data. As such, the user device 12 may scramble data generated by the electronic sensor devices 18 when a time period associated with the generated data is outside of the time period. Similarly, the user may provide filter data indicative of when and/or what type of user data the user does not want to send.

In some embodiments, the user device 12 may automatically determine whether or not to scramble the data based on identified dwelling features in the data acquired by the electronic sensor devices 18. For example, image data acquired by an electronic sensor devices 18 may include dwelling features (e.g., paintings, sculptures, stamps), room dimensions, outdoor landmarks (e.g., trees, street signs, outdoor home decorations), and the like, which may facilitate identification of the property 26. The dwelling features may be identified based on, for example, image recognition techniques (e.g., pattern matching, optical character recognition). Additionally or alternatively, the user-defined criteria and/or filter data may include certain dwelling features (e.g., a reference image of a painting stored in the memory 32) that indicate what portions of the data generated by the electronic sensor data 18 should be scrambled. In any case, the user device 12 may scramble data captured by electronic sensor devices 18 that include certain dwelling features to protect the privacy of the user by preventing unwanted personnel from identifying the property 26.

In some embodiments, the selective scrambling application 19 may enable the user to select the target device(s) 16 that receive the scrambled data. Moreover, the selective scrambling application 19 may enable the user to select to what extent the data is scrambled and/or which target devices 16 should receive unscrambled data. For example, a security company may manage the electronic sensor device 18, and the user may provide scrambled data to the security company, while providing the unscrambled data captured by the electronic sensor device 18 to a user device owned by neighbor or a user device owned by a relative (e.g., while the user is on vacation). In any case, the selective scrambling application 19 may prompt the user to provide a first input indicating that target devices 16 owned by the security company or the user devices owned by the neighbor or the relative may receive the data captured by the electronic sensor device 18. In some embodiments, the selective scrambling application 19 may prompt the user to provide a second input indicating how long the selective scrambling application 19 should send the data and/or scrambled data to the security and/or user devices specified by the user. As such, the selective scrambling application 19 may provide data and/or scrambled data to the user devices 16 based on user input.

In some embodiments, the selective scrambling application 19 may prompt the user to provide an input indicating the user-defined criteria. For example, in response to detecting a new electronic sensor device 18 that is connected to the network 14 or communicatively coupled to the user device 12, the selective scrambling application 19 may prompt the user to provide an input indicating keywords and/or filter data to determine whether the data captured by the new electronic sensor device 18 should be scrambled before transmission. In particular, when the electronic sensor device 18 generate user data that has a data size, data type, or the like that correlates to or matches the filter data provided by the user, the selective scrambling application 19 may scramble the data.

Figure 2:
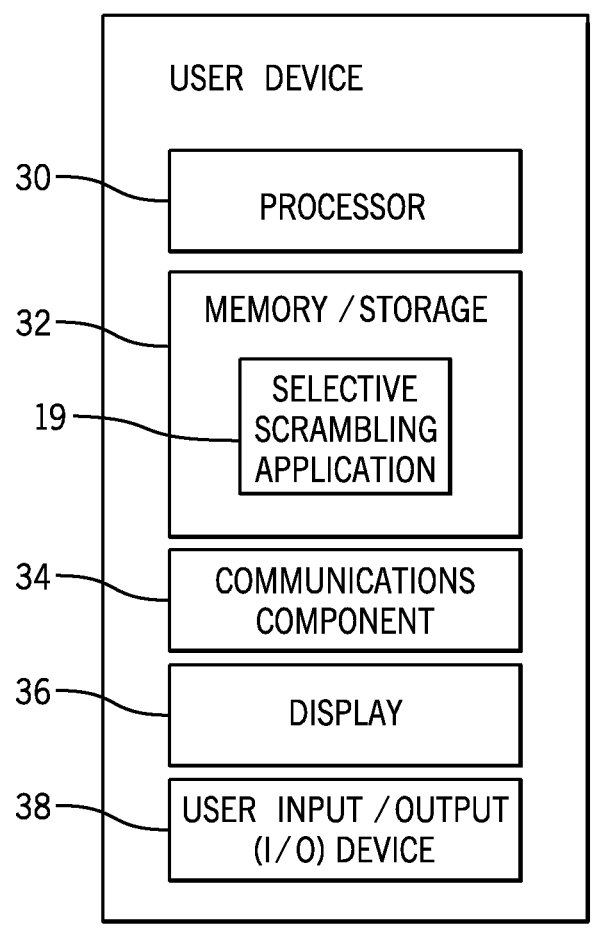
FIG. 2 is a block diagram of a computing system that may be used in conjunction with the system of FIG. 1, in accordance with embodiments described herein.

To perform one or more operations described herein, the user device 12 may include various types of components that may assist the user device 12 in performing the operations described below. For example, as shown in FIG. 2, the user device 12 may include a processor 30, memory/storage 32, a communication component 34, a display 36, input/output (I/O) port 38, and the like, in accordance with embodiments described herein.

The processor 30 may be any type of computer processor or microprocessor capable of executing computer-executable code. The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array) or an ASIC (application specific integrated circuit). Processors suitable for the execution of a computer program include, by way of example, both general and special purpose microprocessors, and/or processor(s) of any appropriate kind of digital computer.

The memory and the storage 32 may be any suitable articles of manufacture that store processor-executable code, data, or the like. These articles of manufacture may include non-transitory computer-readable media (e.g., any suitable form of memory or storage) that may store the processor-executable code used by the processor 30 to perform the presently disclosed techniques. As used herein, applications may include any suitable computer software or program that may be installed onto the user device 12 and executed by the processor 30. It should be noted that non-transitory merely indicates that the media is tangible and not a signal. As illustrated, the memory and/or the storage 32 may store the selective scrambling application 19.

The communication component 34 may be a wireless or wired communication component that may facilitate communication between the user device 12, and various other computing systems via the network 14, the Internet, or the like. The display 36 may depict visualizations associated with software or executable code being processed by the processor 30. The display 36 may be any suitable type of display, such as a liquid crystal display (LCD), plasma display, or an organic light emitting diode (OLED) display, a projected display, and the like. Additionally, in one embodiment, the display 36 may be provided in conjunction with a touch-sensitive mechanism or touch display (e.g., a touch screen) that may function as part of a control interface for the user device 12 and be capable of receiving inputs from a user (e.g., the property owner). The I/O ports 38 may be interfaces that may couple to other peripheral components such as input devices (e.g., keyboard, mouse), the input/output (I/O) devices 38, and the like. For example, to provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Figure 3:
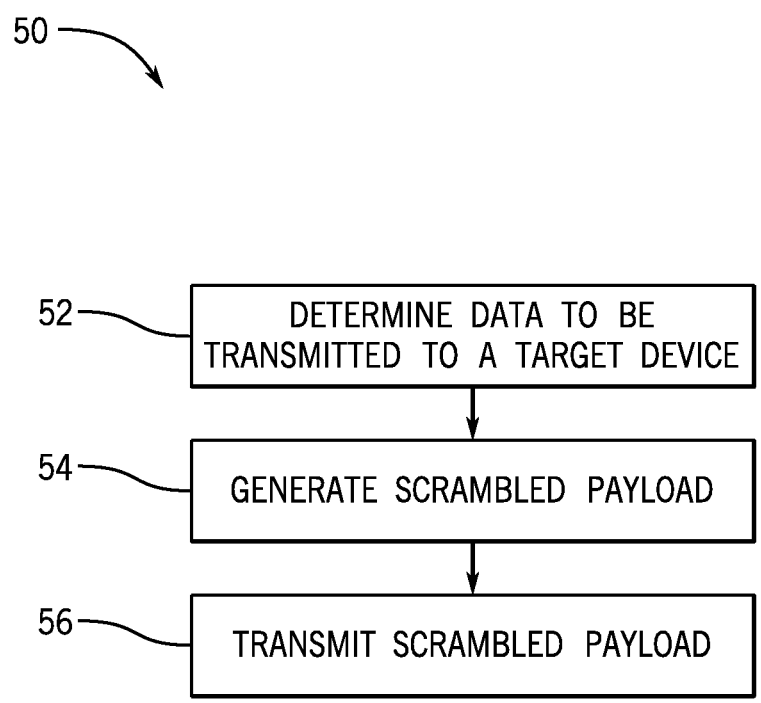
FIG. 3 is a flow diagram for scrambling data when the data is being transmitted to a third-party, in accordance with embodiments described herein.

FIG. 3 illustrates an example process 50 that may be employed by the selective scrambling application 19 to identify data to scramble based on a recipient of the data captured by an electronic sensor device 18, in accordance with embodiments described herein. The steps of the process 50 may be stored in the memory and/or the storage 32. Before proceeding, it should be noted that the process 50 is described as being performed by the processor 30 of the user device 12 (e.g., executing the selective scrambling application 19 stored in the memory and/or the storage 32), but the process 50 may be performed by other suitable computing devices. Although described in a particular order, which represents a particular embodiment, it should be noted that the process 50 may be performed in any suitable order. Additionally, embodiments of the process 50 may omit process blocks and/or include additional process blocks.

As illustrated in block 52, the processor 30 determines data to be transmitted to a target device 16. In general, the processor 30 may receive data or a data packet including data acquired by an electronic sensor device 18 and determine that the data is being transmitted to a target device 16 based on a header and/or metadata associated with the data packet. For example, the data may be captured by a recently installed electronic sensor device 18. By identifying the data to be transmitted to the target device 16, the processor 30 may intercept unscrambled data that the user may not want transmitted to the device 16. As another non-limiting example, the processor 30 may identify data of certain type, such as video data, image capture data, and/or audio data. As such, the processor 30 may proceed to block 54 when the data includes video data, image capture data, and/or audio data. It some embodiments, the selectively scrambling application 19 may cause the processor 30 to default to scrambling such data. In additional or alternative embodiments, the processor 30 may output a control signal that causes a pop-up or notification to be displayed on a user device 12 that notifies the user that data from an electronic sensor device 18 has been generated and intercepted by the selective scrambling application 19, which may be scrambled. In some embodiments, the pop-up or notification may allow the user to provide input indicating whether the selective scrambling application 19 should scramble the data (e.g., proceed to block 54). For example, the pop-up or notification may include an input (e.g., an "OK" button) that, when selected by user, causes the selective scrambling application 19 to scramble the data. In this way, the user is made aware of an electronic sensor device 18 that is transmitting data, and may choose whether to scramble the data.

At block 54, the processor 30 scrambles the data to generate scrambled data. As discussed herein, scrambling data includes randomizing at least a portion of the data by randomly inserting and/or deleting portions of the data to generate a data that is unusable by the third party, such as by inserting random numbers, strings, and/or binary bits. In some embodiments, the processor 30 may scramble the payload of the data in response to identifying the data is being transmitted to the target device 16. At block 56, the processor 30 transmits the scrambled data to the target device 16. In some embodiments, the processor 30 may generate a data packet having the scrambled data as a payload and transmit the data packet to the target device 16. In alternative or additional embodiments, the payload of a data packet used to transmit the data captured by the electronic sensor device 18 may be scrambled, while a header and metadata of the packet are maintained (e.g., not scrambled).

In this manner, the process 50 may enable the user device 12 to selectively scramble data captured by an electronic sensor device 18. As discussed herein, by transmitting the data to the target device 16, the target device 16 may still operate in accordance with a user agreement associated with the target device 16. However, since the target device 16 receives scrambled data (e.g., the scrambled payload), the scrambled data is unusable by the third party, which may be useful to the user to protect the privacy of the user.

Figure 4:
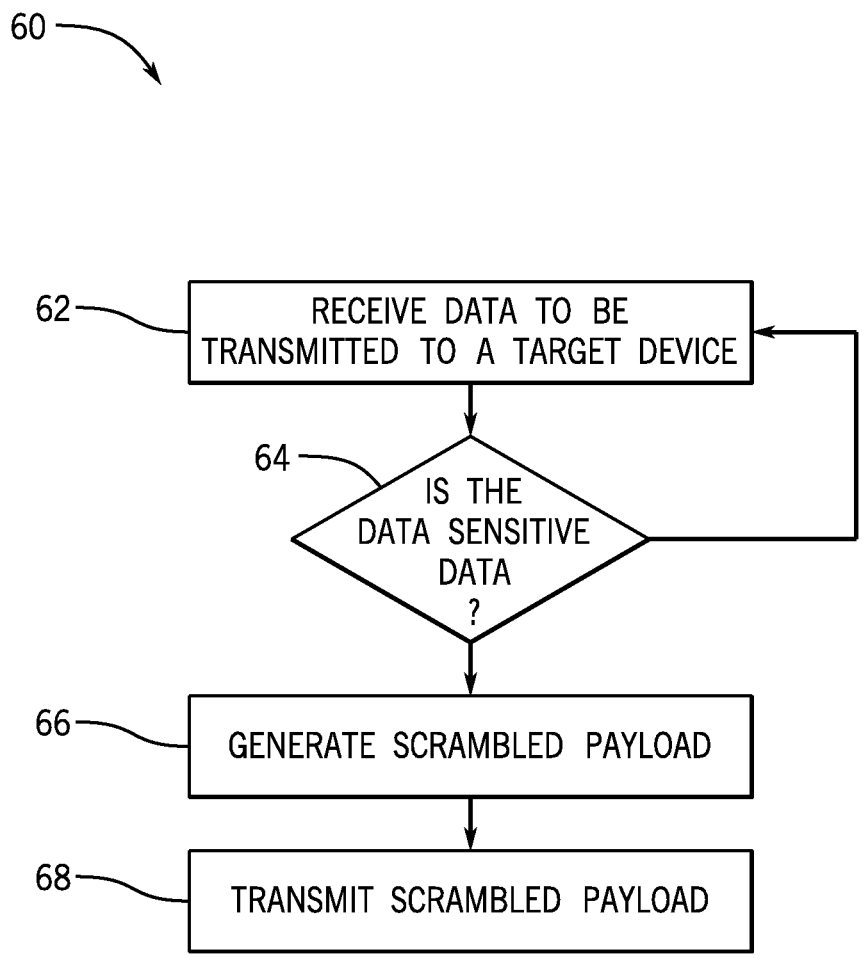
FIG. 4 is a flow diagram for selectively scrambling data captured by electronic sensor devices based on one or more characteristics of the data, in accordance with embodiments described herein.

FIG. 4 illustrates an example process 60 that may be employed by the selective scrambling application 19 to selectively scramble data generated by an electronic sensor device 18 based on characteristics of the data, in accordance with embodiments described herein. For example, the steps of the process 60 may be stored in the memory and/or the storage 32. Before proceeding, it should be noted that the process 60 described below is described as being performed by the processor 30 of the user device 12 (e.g., executing the selective scrambling application 19 stored in the memory and/or the storage 32), but the process 60 may be performed by other suitable computing devices. Although described in a particular order, which represents a particular embodiment, it should be noted that the process 60 may be performed in any suitable order. Additionally, embodiments of the process 60 may omit process blocks and/or include additional process blocks.

At block 62, the processor 30 receives the data acquired by the electronic sensor device 18. In general, the processor 30 may receive or intercept the data acquired by the electronic sensor device 18. For example, the processor 30 may be configured to receive the data from the communications hub 13 before the data is transmitted to the target device 16. In some embodiments, the processor 30 may receive or intercept the data continuously or periodically. For example, to prevent the processor 30 from utilizing too many memory resources, the processor 30 may intercept data periodically (e.g., every minute, every hour, every day) or during a time frame (e.g., between 5:00 pm to 8:00 am) when the user may be home. In some embodiments, this process (e.g., the process 60 beginning with block 62) may be performed in response to identifying the data transmitted by the electronic sensor device 18, as discussed above with respect to block 52 of FIG. 3. For example, the processor 30 may identify devices transmitting data using the network 14. When the processor 30 identifies a new device (e.g., a new electronic sensor device), the processor 30 may intercept the data and the process may proceed to block 64.

At block 64, the processor 30 determines one or more characteristics of the data. In general, the one or more characteristics of the data indicate whether the data may be sensitive. As such, the user may not want to send the data to the target device 16. For example, the processor 30 may determine a size of the data, a type of the data, and/or a company associated with the electronic sensor device 18 that captured the data (e.g., as indicated in the payload, the header, or the metadata of the data packet). As one non-limiting example, the data may include an identifier that indicates the data was captured by a nanny cam. As such, the processor 30 may proceed to block 66 when the data is associated with the nanny cam.

In some embodiments, at block 64, the processor 30 may compare the determined characteristics to user-defined criteria provided by the user As discussed herein, characteristics of the data may include the type of the data, the size of the data, the company associated with the target device to receive the data, and so. As one non-limiting example, the processor 30 may compare the size of the data to a predetermined data size threshold (e.g., provided by a user or programmed prior to implementation). When the data size is above the threshold, the process may proceed to block 66.

As another non-limiting example, the one or more characteristics may include a time period associated with when the data was captured, such as a time period corresponding to when the property owner or an authorized user is home. As such, the processor 30 may proceed to block 66 when the time period corresponds to when the property owner is home. If the processor 30 determines that the one or more characteristics of the data do not indicate that the data is sensitive, the processor 30 may return to block 62.

At block 66, the processor 30 scrambles the data captured by the electronic sensor device 18 in a similar manner as discussed above with respect to block 54 of FIG. 3. At block 68, the processor 30 transmits the scrambled data to the target device 16 in a similar manner as discussed above with the respect to block 56 of FIG. 3. In this manner, the process 60 may enable the user device 12 to selectively scramble data captured by an electronic sensor device 18. As discussed herein, by transmitting the data to the target device 16, the target device 16 may still operate in accordance with a user agreement associated with the target device 16. However, since the target device 16 receives scrambled data, the scrambled data is unusable by the third party, which may protect the privacy of the user.

Figure 5:
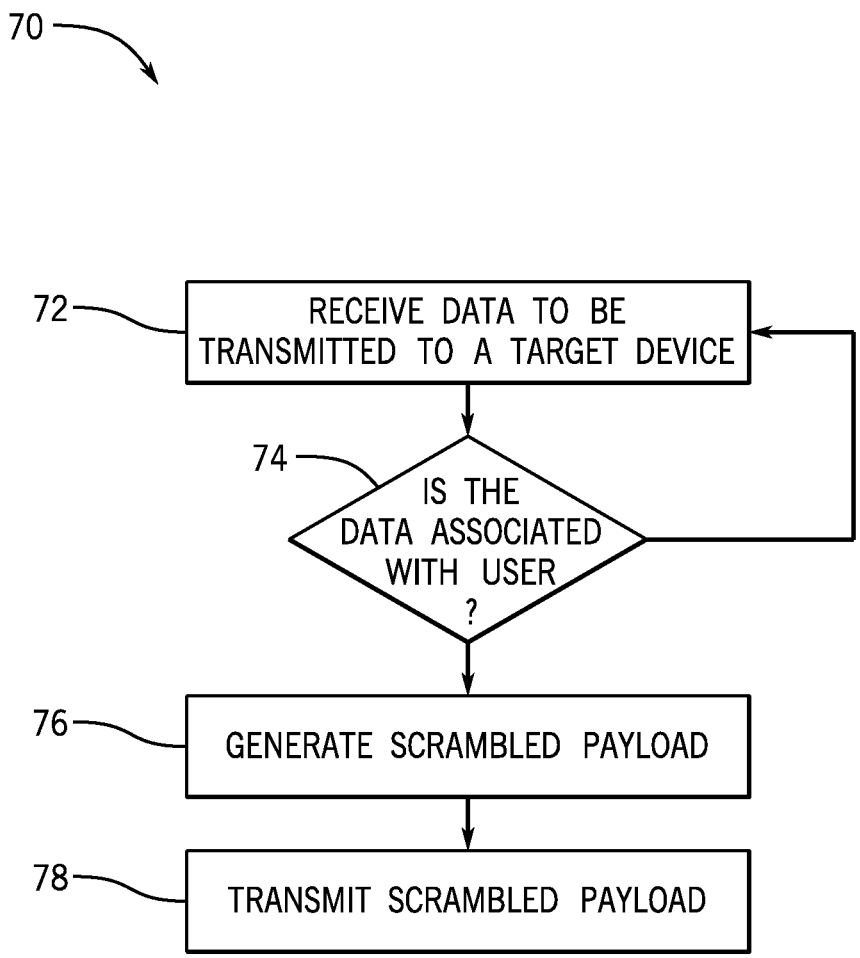
FIG. 5 is a flow diagram for selectively scrambling data captured by electronic sensor devices based on the data being associated with a user, in accordance with embodiments described herein.

FIG. 5 illustrates an example process 70 that may be employed by the selective scrambling application 19 to selectively scramble data generated by an electronic sensor device 18 based on whether the data generated by the electronic sensor device is associated with a user of the property 26, in accordance with embodiments described herein. For example, the steps of the process 70 may be stored in the memory and/or storage 32. Before proceeding, it should be noted that the process 70 described below is described as being performed by the processor 30 of the user device 12 (e.g., executing the selective scrambling application 19 stored in the memory and/or the storage 32), but the process 70 may be performed by other suitable computing devices. Although described in a particular order, which represents a particular embodiment, it should be noted that the process 70 may be performed in any suitable order. Additionally, embodiments of the process 70 may omit process blocks and/or include additional process blocks.

At block 72, the processor 30 receives the data acquired by the electronic sensor device 18. In general, this process may be performed in response to identifying the data transmitted by the electronic sensor device 18 as discussed above with respect to block 52 of FIG. 3 and with respect to block 62 of FIG. 4.

At block 74, the processor 30 determines whether the received data is associated with the user. In some embodiments, the processor 30 may determine whether a mobile device (e.g., a smartphone, wearable device, laptop, tablet, the user device 12) of the user (e.g., a property owner associated with property 26) is within the property 26 based on a distance between the mobile device and the electronic sensor device 18 (e.g., using geo-fencing techniques). For example, when the distance between the mobile device and electronic sensor device 18 is below a distance threshold, as discussed below, this may indicate that the user is within or near the property 26 (e.g., at home), and thus, data from the electronic sensor device 18 may be associated with the user. For example, the selective scrambling application 19 may receive a location of the mobile device. The location of the mobile device may include a GPS-coordinate from the user's mobile phone or be based on whether the mobile device and the electronic sensor device 18 are connected to the same WiFi network, whether the mobile device and the electronic sensor device 18 are connected over a Bluetooth connection, and/or whether communication between the mobile device and another electronic sensor device 18 indicates a location of the mobile device (e.g., that may be held by the user) relative to the electronic sensor device 18 that captured the received data. In any case, the selective scrambling application 19 may compare the location of the mobile device (e.g., which may include the user device 12) with a location associated with the electronic sensor device 18. When a distance between the location of the mobile device and the location of the electronic sensor device 18 is within a certain range (e.g., 5 ft., 10 ft., 50 ft., 100 ft., and so), then the processor 30 may determine that the received data is associated with the user.

As another non-limiting example, the processor 30 may compare audio data to reference audio data (e.g., previously captured audio data of an authorized or identified person or persons) to determine whether the audio data is the voice of the property owner or other authorized inhabitants. For example, the processor 30 may compare sound characteristics of the audio data to sound characteristics corresponding to reference audio data of the user, which may be provided by the user during or after setup of the selective scrambling application 19. When the sound characteristics of the audio data correlate to or match the sound characteristics of the reference audio data corresponding to the user, the processor 30 may determine that the received data is associated with the user and the process 70 proceeds to block 76. Additionally or alternatively, the processor 30 may analyze the audio data and determine whether any words in the audio data match sensitive information associated with the property owner and/or other inhabitants of the property 26. As used herein, sensitive information refers to words, phrases, pieces of information, and/or images indicative of user credentials (e.g., user names, passwords, passphrases, personal identification numbers (PINs), personal information, birthdates, family names, activation keys, encryption keys) and user accounts (e.g., a name of an account holder, account numbers, expiration dates of credit cards, security codes, billing addresses, email addresses). In some embodiments, sensitive information may be used to access real world locations (e.g., granting access to buildings or vehicles having a digital locking mechanism), online financial accounts, and the like. The processor 30 may use any suitable technique to determine whether the audio data comprises sensitive information, such as language recognition techniques, language identification techniques, language guessing techniques, natural language understanding techniques, natural language interpretation techniques, speech recognition techniques, and so on. When the processor 30 determines that the audio data includes the sensitive information, the processor 30 may determine that the received data is associated with the user and the process 70 proceeds to block 76.

In some embodiments, the processor 30 may determine whether the data is associated with the user based on a comparison of image data obtained by the electronic sensor device 18 and a reference image data (e.g., stored in the memory and/or storage 32), such as by using facial recognition techniques. For example, the processor 30 may identify one or more biometric points of an image of an identified face. Then, the processor 30 may compare a number of identified biometric points in the image data to a number biometric points in the reference image data to determine whether the image includes the property owner or other authorized people (e.g., a babysitter, family members, friends, a maid). As such, when the processor 30 determines that the image data includes an image of the property owner, the processor 30 may determine that the received data is associated with the user.

In some instances, the processor 30 may determine whether the image data matches the reference image data based on a threshold. For example, the processor 30 may use certain image recognition techniques, such as optical character recognition, pattern matching and gradient matching, face recognition, and the like. Continuing with the example of using biometric points for facial recognition, the threshold may correspond to a number of biometric points in the image data that match the biometric points in the reference image data (e.g., 100% of the biometric points matching, greater than 90% of the biometric points matching, greater than 80% of the biometric points matching, greater than 50% of the biometric points matching). If the match is below the threshold, the processor 30 may output a control signal that causes a pop-up or notification to be displayed on a display of the user device 12 that the selective scrambling application 19 is running on. The pop-up or notification may inform the user of a potential intruder within the property and depict one or more buttons for the user to select to indicate whether or not the image depicts a potential intruder. At least in some instances, the processor 30 may output an alert to the third party, neighborhood security, and/or emergency response personnel (e.g., firefighters, police) in response to the user indicating that there is an intruder at the property 26.

At block 76, the processor 30 scrambles the data captured by the electronic sensor device 18 in a similar manner as discussed above with respect to block 54 of FIG. 3. At block 78, the processor 30 transmits the scrambled data to the target device 16 in a similar manner as discussed above with the respect to block 56 of FIG. 3.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An electronic device, comprising:
one or more processors;
a memory storing instructions that, when executed by the one or more processors, cause the one or more processors to:
receive data captured by one or more electronic sensor devices;
determine a time period to intercept additional data from the electronic sensor devices to be transmitted to an additional electronic device based on characteristics of the data;
intercept the additional data within the time period;
determine that the additional data comprises sensitive information;
scramble a payload portion of the additional data to generate scrambled data based on the additional data comprising the sensitive information; and
transmit the scrambled data to the additional electronic device.

2. The electronic device of claim 1, wherein the instructions cause the one or more processors to receive an input related to a user agreement associated with the one or more electronic sensor devices, and wherein the time period to intercept the data is subsequent to receiving the input.

3. The electronic device of claim 1, wherein the instructions cause the one or more processors to:
determine a periodicity that the one or more electronic sensor devices are attempting to transmit the data; and
determine that the additional data captured by the one or more electronic sensor devices is to be transmitted to the additional electronic device based on the periodicity.

4. The electronic device of claim 3, wherein the instructions that cause the one or more processors to scramble the payload portion of the additional data are based on the additional data being transmitted to the additional electronic device.

5. The electronic device of claim 1, wherein the characteristics of the data comprise a type of data, and wherein the type of data comprises image data, audio data, or both.

6. The electronic device of claim 1, wherein the characteristics comprise an identifier of a company associated with the one or more electronic sensor devices.

7. The electronic device of claim 1, wherein the instructions that cause the one or more processors to scramble the payload portion of the additional data comprises randomizing the payload portion of the additional data.

8. The electronic device of claim 1, wherein the one or more electronic sensor devices comprise a voice communication device.

9. The electronic device of claim 1, wherein the one or more electronic sensor devices comprise an image capture device.

10. One or more tangible, non-transitory, computer-readable media storing instructions that, when executed by one or more processors, cause the one or more processors to:
receive data transmitted by an electronic sensor;
determine a time period to intercept additional data from the electronic sensor to be transmitted to a target device based on one or more characteristics of the data being characterized as sensitive information and a comparison of the data to reference data;
intercept the additional data within the time period;
scramble a payload portion of the additional data to generate scrambled data based on the additional data comprising sensitive information; and
transmit the scrambled data to the target device.

11. The one or more tangible, non-transitory, computer-readable media of claim 10, wherein the instructions cause the one or more processors to scramble the payload portion of the additional data based on the additional data to be transmitted to the target device.

12. The one or more tangible, non-transitory, computer-readable media of claim 10, wherein the data transmitted by the electronic sensor comprises audio data, the additional data comprises additional audio data, and the reference data comprises reference audio data.

13. The one or more tangible, non-transitory, computer-readable media of claim 12, wherein the reference audio data comprises information categorized by a user as sensitive information, and wherein the one or more characteristics of the data being characterized as sensitive information is based on sound characteristics of the audio data correlating with sound characteristics of the reference audio data.

14. The one or more tangible, non-transitory, computer-readable media of claim 10, wherein the instructions cause the one or more processors to maintain a header portion of the additional data.

15. A method, comprising:
receiving, via one or more processors, sensor data transmitted by an electronic sensor;
determining, via the one or more processors, a time period to intercept additional sensor data from the electronic sensor to be transmitted to a target device based on characteristics of the sensor data;
intercepting the additional sensor data within the time period;
determining that the additional sensor data comprises sensitive information;
scrambling, via the one or more processors, a payload portion of the additional sensor data to generate scrambled data based on the additional data comprising the sensitive information; and
transmitting, via the one or more processors, the scrambled data to the target device.

16. The method of claim 15, wherein the characteristics of the sensor data comprise a data type, wherein the data type comprises video data, audio data, image data, or any combination thereof, and wherein the payload portion of the additional sensor data is scrambled to generate scrambled data based on the sensor data comprising the data type.

17. The method of claim 15, comprising determining, via the one or more processors, that the sensor data comprises the one or more characteristics based on a comparison between image capture data representative of the sensor data to a reference image.

18. The method of claim 15, comprising:
  receiving, via the one or more processors, an input related to a user agreement associated with one or more electronic sensor devices, wherein the input indicates a type of the sensor data, a size of the sensor data, a company associated with the sensor data, or any combination thereof; and
  determining, via the one or more processors, that the sensor data comprises the one or more characteristics based on determining that the one or more characteristics correlate to the input.

* * * * *